June 2, 1931. H. G. KAMRATH 1,808,170
AIR CLEANER
Filed March 22, 1928
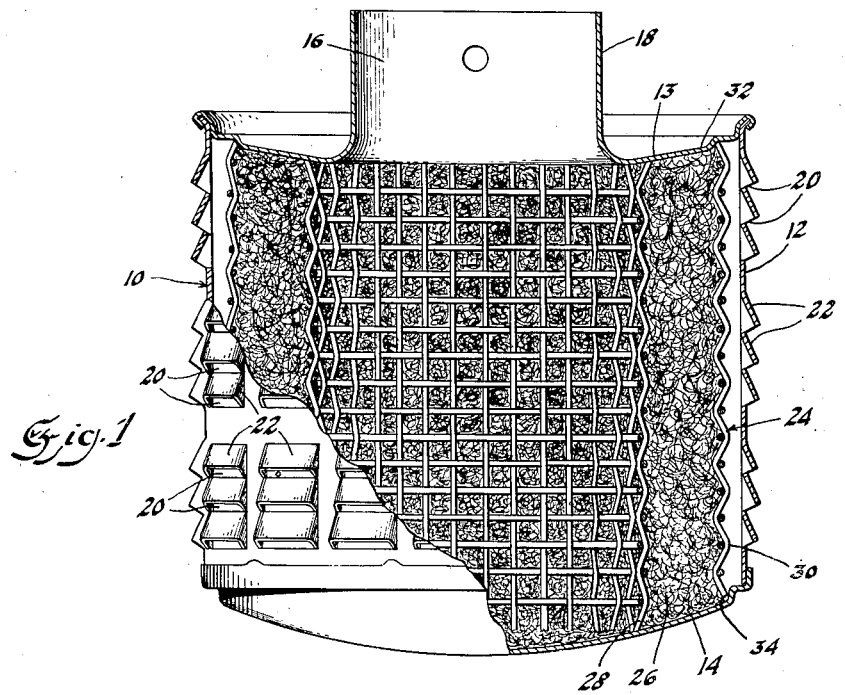
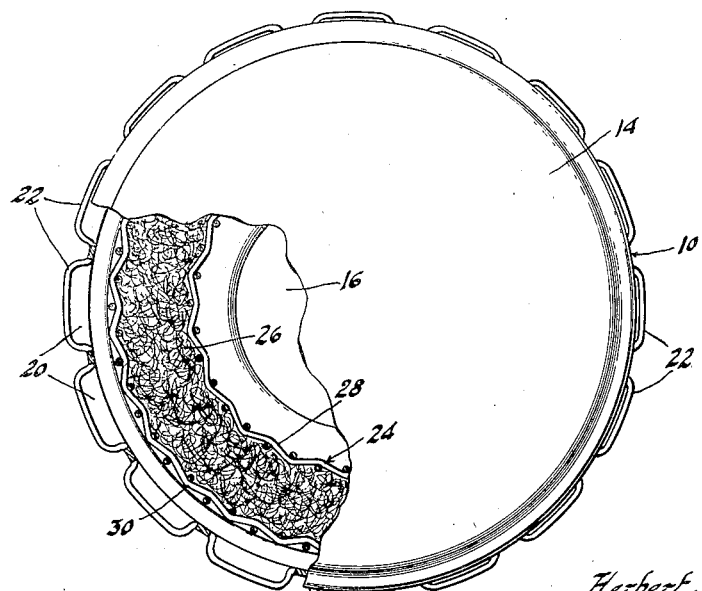
Inventor
Herbert G. Kamrath
By Blackmore, Spencer & Flint
Attorneys Patented June 2, 1931

1,808,170

UNITED STATES PATENT OFFICE

HERBERT G. KAMRATH, OF FLINT, MICHIGAN, ASSIGNOR TO A C SPARK PLUG COMPANY, OF FLINT, MICHIGAN, A COMPANY OF MICHIGAN

AIR CLEANER

Application filed March 22, 1928. Serial No. 263,931.

This invention relates to air cleaners of the type described and claimed in my prior application Serial No. 245,404, filed January 9th, 1928. The cleaner described in the said application is designed for use in cleaning the air supplied to the carburetor of an internal combustion engine and is in the form of a filter made by rolling up a tube of woven metal, preferably copper ribbon. In the present case the same filtering material is used, although this is not essential, but the filter is differently arranged. The roll of filtering material is housed in a container preferably of cylindrical shape between top and bottom members, and the side walls of the container are provided with louvered apertures for admitting air to the filter unit. The louvers prevent air being blown directly upon the filtering material and thus effect an initial selection of clean air. The cleaner is preferably so designed that the aggregate area of the apertures in the walls of the container is much greater than the cross-sectional area of the air inlet to the carburetor so that there will be little or no restriction of air flow.

In the drawings:

Figure 1 is a side elevation, mostly in section, showing my improved air cleaner.

Figure 2 is a bottom plan view of the cleaner with parts broken away.

Refering to the drawing 10, indicates as an entirety the cylindrical casing within which my filter unit is housed. The casing comprises a cylindrical wall member 12, a top member 13, and bottom member 14. The top member 13 is centrally apertured as at 16 to provide an outlet through which clean air passes to the carburetor. The members 13 and 14 as well as the cylindrical wall member 12, are preferably formed of sheet metal and with this material it is an easy matter to form the top member so as to provide a tubular extension 18 adapted for connection to the carburetor air inlet. The cylindrical wall member 12 is pierced to form a multitude of openings 20, each equipped with its louver 22. In the installation illustrated the openings 20 face downwardly so that air from the usual cooling fan or the breeze produced by the motion of the vehicle cannot enter the openings directly. Consequently the dust particles are carried past the openings by their greater inertia and the relatively clean air turns back upon itself to enter the filter casing in response to engine suction.

The filter unit is indicated by the reference numeral 24. It consists primarily of a cylindrical mass 26 of filtering material clamped between the end members 13 and 14. The mass is confined between relatively rigid cylindrical walls 28 and 30 of foraminous material. The outer wall 30 is preferably spaced from the cylindrical wall 12 of the casing as shown, although this is not essential. To insure this spacing I have provided means for centering the unit in the casing. This may be done in various ways. I have preferred to provide the top member 13 with an annular depression 32 fitting within the outer member 30 and I have provided the bottom member 14 with an annular ridge 34 within which the same member is received. Obviously, if preferred, the inner member 28 may be centered instead of the outer member and this may be done in various ways.

While parts 12, 13 and 14 have been referred to as members it is to be understood that this terminology does not mean that they may not be integrally joined or secured together by welding or soldering according to any arrangement preferred.

The filter thus constructed possesses the advantage that only relatively clean air finds access to the filter element. This element, as described in the prior application, is of such construction that it interferes little with the passage of air, and at the same time the dust adheres to the oil coated metal. When necessary the cleaner may be dipped in gasoline or other cleaning fluid to remove collected dust and render it ready for further use. The design is also such that the aggregate area of the openings 20 is greater than the cross-sectional area of the clean air outlet 16 so that there is no restriction of flow other than that caused by the filtering material itself. This restriction is very low and furthermore possesses the advantage that it silences the engine, serving to eliminate the aspirating noise so objectionable in some engines, especially where the caburetor is designed with too small an air intake.

Should it be desired to use the cleaner in another position than that shown, it is merely necessary to invert the cylindrical member 12 in assembly.

I claim:

1. An air cleaner comprising a casing including a substantially cylindrical side wall member and end wall members rigidly secured to the side wall member, one of said end members being provided with an axial clean air outlet, a hollow cylinder of oil-wetted filtering material lining the interior of the cylindrical member, a rigid foraminous member within the cylinder of filtering material, said filtering material and foraminous member extending from end to end of the casing and being tightly confined between the end members, said cylindrical side wall member being provided with a plurality of parallel horizontally extending radially and axially spaced slots, the material of the casing at the upper sides of the slots being pressed outwardly to form louvers integrally united at their top and side edges to the casing wall.

2. An air cleaner comprising a casing including a substantially cylindrical side wall member and end wall members rigidly secured to the side wall member, one of said end members being provided with an axial clean air outlet, a hollow cylinder of oil-wetted filtering material lining the interior of the cylindrical member, means for holding the filtering material in place within the cylinder, said filtering material extending from end to end of the casing and being tightly confined between the end members, said cylindrical side wall member being provided with a plurality of horizontally extending axially and radially spaced slots, the material of the casing at the upper sides of the slots being pressed outwardly to form louvers integrally united at their top and side edges to the casing wall to prevent the entrance of dust into the casing, said cylindrical wall member being reversible to adapt the cleaner for use with oppositely facing air intakes.

3. An air cleaner comprising a casing including a cylindrical side wall member and end wall members secured to the side wall member, one of said members being provided with an axial clean air outlet, a hollow cylinder of filtering material lining the interior of the cylindrical member, said filtering material extending from end to end of the casing and being tightly confined between the end members, said cylindrical side wall member being provided with a plurality of horizontally extending radially and axially spaced slots, the material of the casing at the upper sides of the slots being pressed outwardly to form louvers to prevent the entrance of dust into the casing, said cylindrical wall member being reversible to adapt the cleaner for use with oppositely facing air intakes.

In testimony whereof I affix my signature.

HERBERT G. KAMRATH.